US011514803B2

(12) United States Patent
Miller et al.

(10) Patent No.: US 11,514,803 B2
(45) Date of Patent: Nov. 29, 2022

(54) METHOD AND APPARATUS FOR VEHICLE TO DRONE INTERACTION

(71) Applicant: Ford Global Technologies, LLC, Dearborn, MI (US)

(72) Inventors: Kenneth James Miller, Canton, MI (US); Aed M. Dudar, Canton, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 16/768,235

(22) PCT Filed: Dec. 1, 2017

(86) PCT No.: PCT/US2017/064258
§ 371 (c)(1),
(2) Date: May 29, 2020

(87) PCT Pub. No.: WO2019/108228
PCT Pub. Date: Jun. 6, 2019

(65) Prior Publication Data
US 2020/0286392 A1 Sep. 10, 2020

(51) Int. Cl.
*G08G 5/00* (2006.01)
*B64C 39/02* (2006.01)
(Continued)

(52) U.S. Cl.
CPC ......... *G08G 5/0069* (2013.01); *B64C 39/024* (2013.01); *B64D 47/08* (2013.01);
(Continued)

(58) Field of Classification Search
CPC .......... G08G 5/0069; B64C 39/024; B64C 2201/027; B64C 2201/127;
(Continued)

(56) References Cited

U.S. PATENT DOCUMENTS 9,056,676 B1 * 6/2015 Wang ................... B60R 9/00
9,305,280 B1 * 4/2016 Berg ..................... B64D 5/00
(Continued)

FOREIGN PATENT DOCUMENTS

CN 107293238 A * 10/2017
DE 102015110812 A1 * 1/2016 ............. B60R 16/02
(Continued)

OTHER PUBLICATIONS

D'Andrea, R., "Can Drones Deliver?," IEEE Transactions on Automation Science and Engineering, Jul. 2014, vol. 11, Issue 3, retrieved from the Internet URL: <https://ieeexplore.ieee.org/stamp/stamp.jsp?tp=&arnumber=6827242>, pp. 647-648.
(Continued)

*Primary Examiner* — Peter D Nolan
*Assistant Examiner* — Kenneth M Dunne
(74) *Attorney, Agent, or Firm* — Brandon Hicks; Brooks Kushman P.C.

(57) ABSTRACT

A vehicle includes a controller that may be configured to, responsive to receiving a delivery request associated with a drone, periodically transmit a current location, trip route information, and acceleration data of the vehicle to guide the drone to a rendezvous location, and responsive to receiving a proximity notification associated with the drone, open a delivery opening of the vehicle.

7 Claims, 3 Drawing Sheets

(51) Int. Cl.
| | |
|---|---|
| *B64D 47/08* | (2006.01) |
| *G01C 21/20* | (2006.01) |
| *G05D 1/00* | (2006.01) |
| *G05D 1/10* | (2006.01) |
| *G05D 1/12* | (2006.01) |
| *G06Q 10/08* | (2012.01) |
| *G06T 7/20* | (2017.01) |
| *G01S 19/42* | (2010.01) |

(52) U.S. Cl.
CPC .............. *G01C 21/20* (2013.01); *G01S 19/42* (2013.01); *G05D 1/0016* (2013.01); *G05D 1/101* (2013.01); *G05D 1/12* (2013.01); *G06Q 10/0836* (2013.01); *G06T 7/20* (2013.01); *B64C 2201/027* (2013.01); *B64C 2201/127* (2013.01); *B64C 2201/128* (2013.01); *B64C 2201/146* (2013.01); *G06T 2207/10032* (2013.01); *G06T 2207/30236* (2013.01)

(58) Field of Classification Search
CPC ........ B64C 2201/128; B64C 2201/146; B64D 47/08; G01C 21/20; G01S 19/42; G05D 1/0016; G05D 1/101; G05D 1/12; G06Q 10/0836; G06T 7/20; G06T 2207/10032; G06T 2207/30236
See application file for complete search history.

(56) References Cited

U.S. PATENT DOCUMENTS

| | | | |
|---|---|---|---|
| 9,494,937 | B2 | 11/2016 | Siegel et al. |
| 9,555,885 | B2 | 1/2017 | Stanek et al. |
| 9,718,564 | B1* | 8/2017 | Beckman ................ B61L 23/00 |
| 10,007,890 | B1* | 6/2018 | Purwin .................... B64D 1/22 |
| 10,217,367 | B2* | 2/2019 | Chun ...................... G08G 5/025 |
| 10,233,021 | B1* | 3/2019 | Brady .................. G06Q 10/047 |
| 2007/0030175 | A1* | 2/2007 | Horstemeyer ........ H04M 3/487 |
| | | | 340/994 |
| 2009/0326753 | A1* | 12/2009 | Chen ........................ G09B 9/04 |
| | | | 701/31.4 |
| 2015/0120094 | A1* | 4/2015 | Kimchi .............. G06Q 30/0641 |
| | | | 701/3 |
| 2015/0127460 | A1 | 5/2015 | Daub et al. |
| 2015/0370251 | A1* | 12/2015 | Siegel .................... B64C 39/024 |
| | | | 701/2 |
| 2016/0068264 | A1* | 3/2016 | Ganesh ................ G06Q 10/083 |
| | | | 701/4 |
| 2016/0107750 | A1 | 4/2016 | Yates |
| 2016/0189098 | A1* | 6/2016 | Beaurepaire ........ H04W 12/084 |
| | | | 705/337 |
| 2016/0196525 | A1* | 7/2016 | Kantor .................. H04W 4/027 |
| | | | 705/330 |
| 2016/0196756 | A1* | 7/2016 | Prakash ................. G08G 5/025 |
| | | | 701/3 |
| 2016/0257401 | A1* | 9/2016 | Buchmueller ....... G06Q 10/047 |
| 2016/0332748 | A1 | 11/2016 | Wang |
| 2017/0011340 | A1* | 1/2017 | Gabbai ................ G08G 5/0034 |
| 2017/0090484 | A1 | 3/2017 | Obaidi |
| 2017/0124511 | A1* | 5/2017 | Mueller ................ H04W 4/029 |
| 2017/0132562 | A1 | 5/2017 | High et al. |
| 2017/0147976 | A1* | 5/2017 | Koch .................. G06Q 10/0833 |
| 2017/0372259 | A1* | 12/2017 | Lesser .................. G05D 1/0676 |
| 2018/0107209 | A1* | 4/2018 | Hardee ................ G06Q 10/083 |
| 2018/0137454 | A1* | 5/2018 | Kulkarni ................ G08G 1/205 |
| 2018/0204205 | A1* | 7/2018 | Giraudo .................. H04W 4/46 |
| 2018/0261112 | A1* | 9/2018 | O'Brien ................ H04W 12/06 |
| 2019/0034877 | A1* | 1/2019 | Cantrell ............... G05D 1/0291 |
| 2019/0043001 | A1* | 2/2019 | Woulfe .............. G01C 21/3438 |
| 2019/0043370 | A1* | 2/2019 | Mulhall .................. G01C 21/20 |
| 2019/0050952 | A1* | 2/2019 | Goldberg ................ A47J 36/32 |
| 2019/0073624 | A1* | 3/2019 | Schaeffer ........... G06Q 30/0643 |
| 2019/0077519 | A1* | 3/2019 | Husain .................. B64C 39/024 |
| 2020/0286393 | A1* | 9/2020 | Priest .................. G06Q 10/0832 |
| 2020/0349852 | A1* | 11/2020 | DiCosola ............... G06Q 20/20 |
| 2020/0410540 | A1* | 12/2020 | Williams ................ G09F 21/14 |

FOREIGN PATENT DOCUMENTS

| | | |
|---|---|---|
| JP | 2016138853 A * | 8/2016 |
| WO | 2014080388 A1 | 5/2014 |

OTHER PUBLICATIONS

Ferrandez, S.M. et al., "Optimization of a truck-drone in tandem delivery network using K-means and genetic algorithm," JIEM: Journal of Industrial Engineering and Management—Jun. 2016, vol. 9, Issue 2, online ISSN: 2013-0953—Print ISSN: 2013-8423, retrieved from the Internet URL: <https://upcommons.upc.edu/bitstream/handle/2117/88986/1929-8707-1-PB.pdf>, pp. 374-388.

Luo, Z. et al., "A Two-Echelon Cooperated Routing Problem for a Ground Vehicle and Its Carried Unmanned Aerial Vehicle," Sensors 2017, vol. 17(5): 1144, published on May 17, 2017, doi: 10.3390/s17051144, retrieved from the Internet URL: <http://www.mdpi.com/1424-8220/17/5/1144/htm>, pp. 1-17.

"Mercedes-Benz Vans Tests Drone-Delivery Program," Automotive Fleet—The Car and Truck Fleet and Leasing Management Magazine, dated Sep. 28, 2017, retrieved from the Internet URLs: <https://www.fleetfinancials.com/142385/mercedes-benz-vans-tests-drone-delivery-program>, pp. 1-3.

Stolaroff, J.K., "The Need for a Life Cycle Assessment of Drone-Based Commercial Package Delivery," Lawrence Berkeley National Laboratory, United States, Dept. of Energy, published on Mar. 25, 2014, DOI: 10.2172/1129145, Yetrieved from th Internet URL: <https://e-reports-ext.llnl.gov/pdf/772743.pdf>, pp. 1-4.

International Search Report of the International Searching Authority for PCT/US2017/064258 dated Feb. 21, 2018.

Feloni, Richard et al. Here Are the Coolest Ways Drones Have Been Used In Advertising. Business Insider India. https://www.businessinsider.in/Here-Are-The-Coolest-Ways-Drones-Have-Been-Used-In-Advertising/articleshow/43832467.cms. Sep. 30, 2014. 30 pages.

Dolan, Andy. Just perfect for the beach . . . an ice cream drone! Sunworshippers can have cold treats flown direct to their deckchairs in a basket-style holder. Daily Mail. https://www.dailymail.co.uk/news/article-3687084/Just-perfect-beach-ice-cream-drone-Sunworshippers-cold-treats-flown-direct-deckchairs-basket-style-holder.html. Jul. 12, 2016. 10 pages.

* cited by examiner

METHOD AND APPARATUS FOR VEHICLE TO DRONE INTERACTION

TECHNICAL FIELD

This application is generally related to systems and methods for drone to vehicle interaction.

BACKGROUND

Drones are becoming increasingly popular in performing regular everyday tasks. For example, drones are being used to provide aerial photographs used in traffic monitoring. Drone technology is evolving and the capabilities of drones continue to increase. These capabilities include lift, navigation, travel speed, obstacle avoidance, and other operational aspects. Some drones are currently being used to deliver items from a distribution center to a residence or a place of business.

SUMMARY

A vehicle includes a controller that may be configured to, responsive to receiving a delivery request associated with a drone, periodically transmit a current location, trip route information, and acceleration data of the vehicle to guide the drone to a rendezvous location, and responsive to receiving a proximity notification associated with the drone, open a delivery opening of the vehicle.

A drone delivery method includes receiving a signal indicative of a speed of a vehicle less than a threshold, and transmitting, to the vehicle, an availability message. The method also includes receiving from the vehicle an item request, retrieving from a location an item associated with the request, guiding a drone to a rendezvous location, and delivering to the vehicle via the drone, the item at the rendezvous location.

A vehicle includes an input device, a transceiver, and a controller. The controller may be configured to, responsive to receiving a delivery request associated with a drone via the input device, periodically transmit, via the transceiver, trip route information of the vehicle to guide the drone to a rendezvous location, and responsive to receiving, via the transceiver, a proximity notification associated with the drone, open a delivery opening.

DETAILED DESCRIPTION

Figure 1:
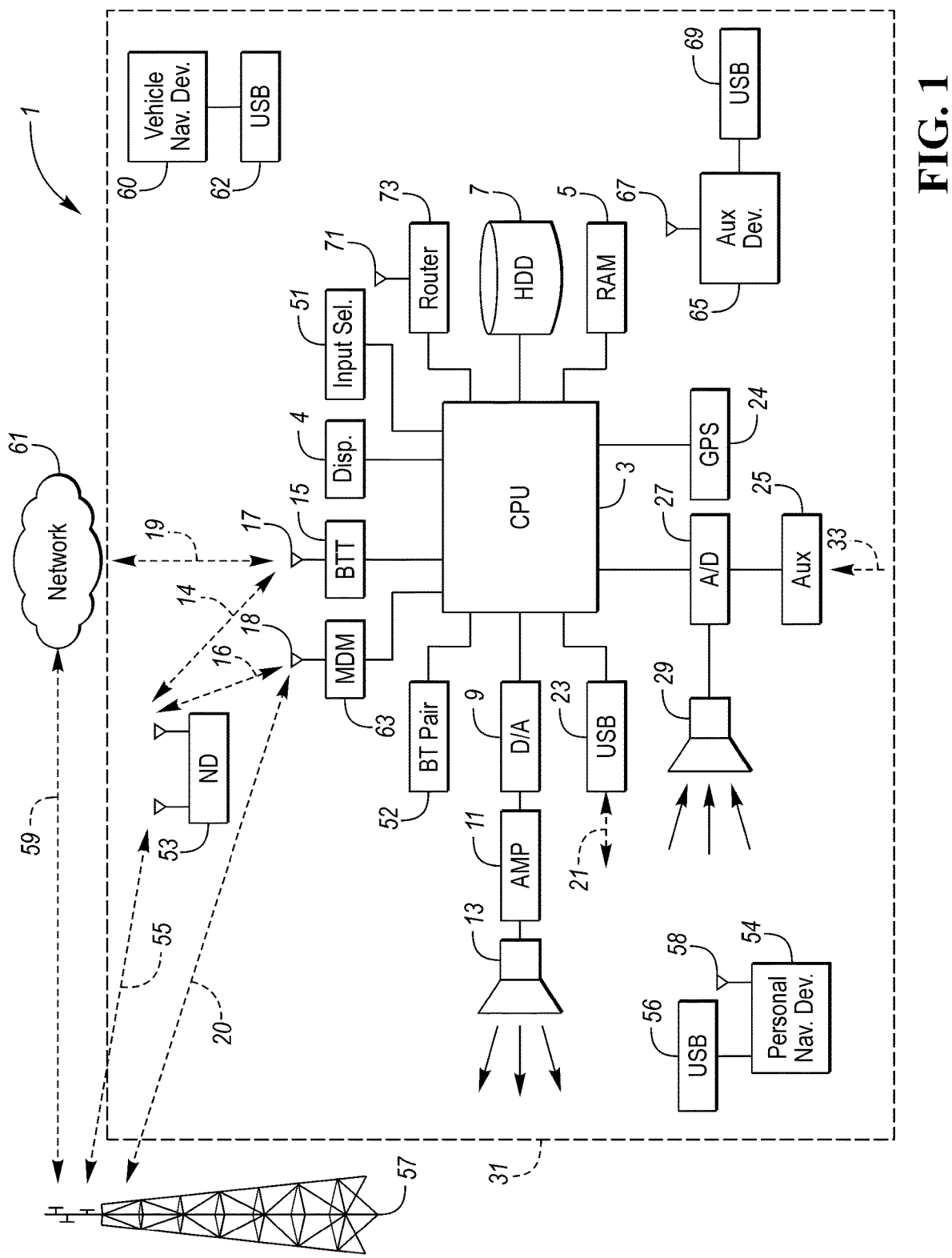
FIG. 1 is schematic diagram of a vehicle computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Drones are becoming increasingly popular in performing regular everyday tasks including delivery of items from a warehouse to a residence or place of business. As such, online commerce companies envision drones performing mobile and nimble package delivery and pickup platforms. As the number of drones increase in popularity, some drones may be deployed in metropolitan and rural locations in which drones are dispersed in the community. For example, some drones may be located at specific private or semi-public locations, the locations include parcel delivery kiosks, distribution centers, shopping centers, or top of light poles. One aspect with a drone delivery infrastructure may be that during a rest/idle state, the drone is under-utilized. Along with other aspects, one aspect of this disclosure is an opportunity to maximize drone usage during idle time periods when customers delivery and pickup demand is low.

In one embodiment, a drone delivers items to an individual that is stuck in traffic congestion. Here, vehicle occupants stuck in traffic may be willing to pay a premium for the delivery of food, drinks, prescriptions, or items while stuck. For example, the food and drinks include a candy bar, granola bar, bag of chips, hot dog, sandwich, coffee, soda, water, while the prescription may include over the counter medication such as aspirin, acetaminophen, ibuprofen, insulin, glucose, an epinephrine autoinjector, buccal (oromucosal) midazolam, that may be used to treat both acute and chronic illnesses including a diabetic emergency, a seizure, a stroke, a heart emergency, a cramp, a headache, and the items may include batteries (e.g., AAA or AA batteries for a child's toy or other electronic device), a car plug adapter (e.g., a car plug to USB, phone interface cable, personal hygiene items (e.g., feminine products, wet wipes, tissue paper, paper towels, make-up, adhesive bandages, a wide mouth bottle, etc.) that could be delivered to their vehicle.

The drone may determine probably of a need exceeds a threshold, for example, the probably of a need may be greater if there is a traffic jam in which all lanes are closed on a limited access highway than if traffic is traveling at a normal rate. Here, the system may determine a need based on a speed of vehicles in traffic, such that a stopped vehicle has a greater need. The drone may also be able to determine if a single vehicle is stopped while other traffic continues at a normal rate of speed. In the example of a single stopped vehicle, the drone may communicate with the vehicle to ascertain the problem, for example, the vehicle may transmit a TPMS fault to the drone such that the drone may offer and deliver a tire patch kit, a small compressor, or other tire repair product. Likewise, the vehicle may transmit an engine fault due to low oil, and the drone may offer and deliver a few quarts of oil to the vehicle. Or the vehicle may transmit an out of fuel message, and the drone may offer and deliver a gallon of fuel to the vehicle. The vehicle and drone may communicate via wireless communication including cellular technology, Dedicated Short-Range Communication (DSRC), 802.x (e.g., Wi-Fi or Bluetooth), or other protocol.

The vehicle and drone may further communicate with businesses. The communication between the vehicle, drone, and businesses may be using a common protocol, or may use different protocols. The protocols also may change as the distance between the drone and vehicle changes. For example, the vehicle and drone may initiate communication via cellular technology, and once the drone is within a specific distance of the vehicle, the communication may switch to a secure link over Wi-Fi. And when the drone is very close to the vehicle, the communication may switch again to Bluetooth.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front-end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a radio frequency transceiver (for example an 802.x transceiver (e.g., Wi-Fi or BLUETOOTH)) input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Here, a mobility system that facilitates drone-based commerce for drivers (or occupants of automated vehicles) stuck in traffic by identifying the needs/wants of drivers and offering the merchandise electronically and/or visually from the drone. Once an item is ordered, delivery of the merchandise is performed via drones.

In one embodiment, a drone identifies a traffic jam/congestion based on multiple inputs such as crowdsourcing, RDS/TMC, and cameras of the drone. The drone may be in flight already monitoring the traffic or may be monitoring from a stationary elevated position, such as a building or other infrastructure. A controller may then determine an occupant need during the traffic jam. The occupant need may be a function of a flow of traffic that allows a determination of a length of time people have been or are predicted to be stuck in traffic, a time, a day of the week, and past sales history associated with similar situations. For example, during a slow morning commute yesterday, there was a high demand for coffee, but during an evening commute there was a high demand for a chicken sandwich. Also, any specific orders from individual customers in a similar traffic jam/congestion (e.g. ordered an item via an app from a nomadic device or from an infotainment system of a vehicle).

The vehicle or nomadic device then communicates with a store in the area such as a coffee shop, restaurant (e.g., bagel/donut, pizza, fast food), general merchandise store, or a drugstore for items such as emergency urinary device, baby food, make-up, or first aid supplies. A drone may then proactively communicates with the vehicles in two methods, visually and electrically. Visual communication includes flying popular items in view of the traffic customers, similar to how a food vendor at the ball park walks around and shows his/her product. This could include a screen or sign on the drone describing (in text or pictures) what items are currently available. The electrical communication includes communication over vehicle to infrastructure (V2I), cellular, Wi-Fi, or other available technology. The drone may include the capability of transmitting to an in-vehicle infotainment system a message such as "Bummer about the traffic. Need food?" The message may be visual or an audible message such that a response either via pushing a button or a verbal response may be used to dispatch the drone to acquire the item of interest.

Also, the occupant of the vehicle may responds in one of a multiple of ways including visual, audible, or telematic, such as a touch of a button in the vehicle, a verbal response, hand waving, audibly calling the drone, flashes headlights of the vehicle. In additional to a vehicle occupant, a pedestrian or a bicycler may also respond to drone. The drone may requests payment information including credit card information to proceed with the transaction. If the drone has an item it may then deliver the item to the customer using a sufficiently long extended arm below drone that keeps the drone and customer separated. In another embodiment, a customer may open a window to retrieve items from drone. If the drone does not have item, the drone/vehicle communicates with nearby store to prepare needed item for pick-up at store and the drone picks-up and delivers the item to the customer in traffic.

Figure 2:
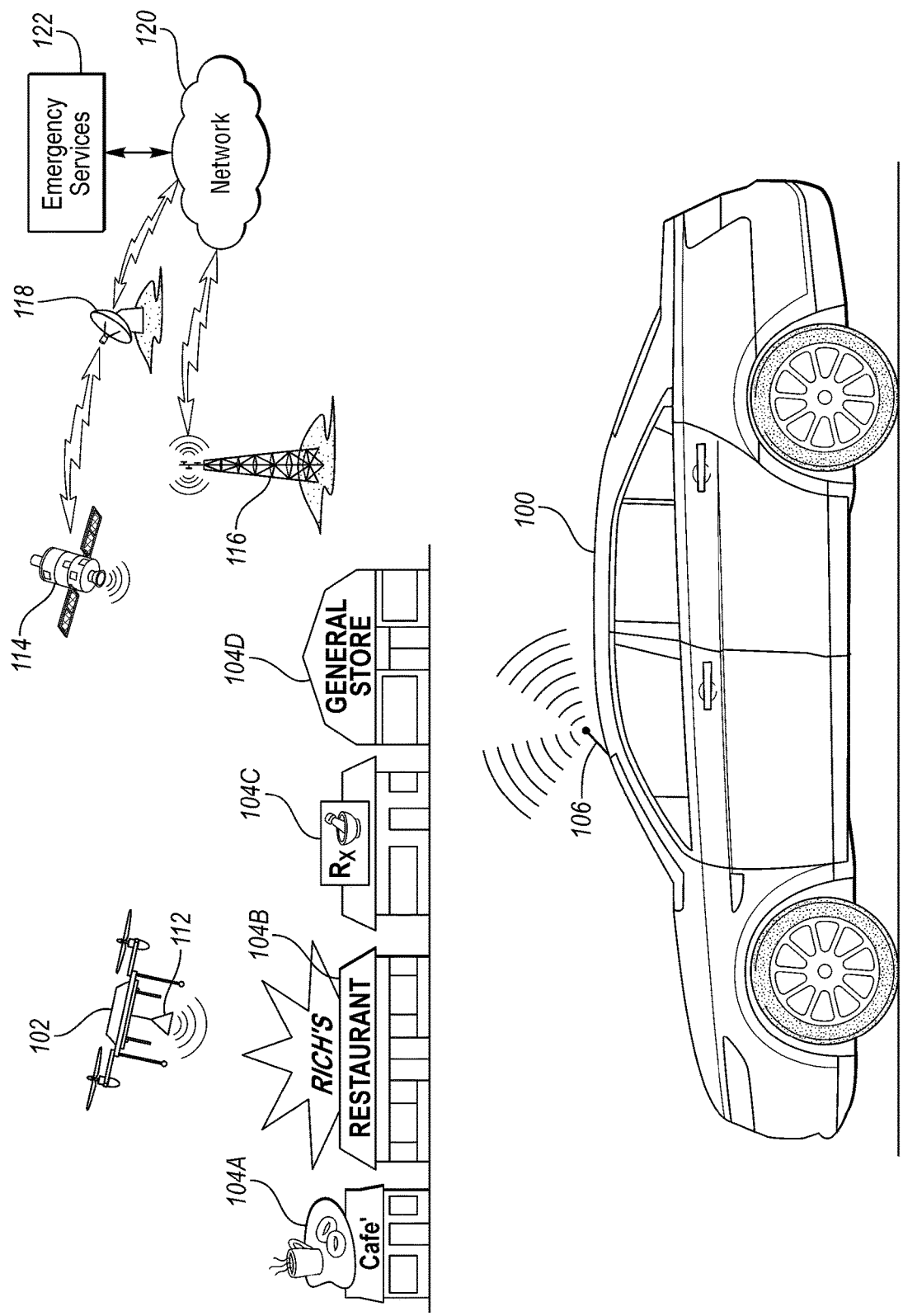
FIG. 2 is an illustration of a vehicle to drone delivery system.

FIG. 2 is an illustration of a vehicle to drone delivery system. Here, a vehicle 100 is shown communicating with a drone 102 and multiple stores/warehouses 104. The stores/warehouses 104 include a café 104A, a restaurant 104B, a pharmacy 104C, and a general store 104D. The stores/warehouses 104 may communicate with the vehicle 100 and drone 102 via wireless communication such as a transceiver 106 of the vehicle 100 and a transceiver 112 of the drone 102. The transceiver 106 may be configured to communicate with a drone transceiver 112 via a frequency and protocol the same as the communication with the stores 104, or via a distinct frequency/protocol. For example, the drone 102 may use Wi-Fi to communicate with the vehicle 100, while the vehicle 100 and drone 102 communicate with the store 104 via cellular technology. The drone 102 may include a second transceiver for communicating with the satellite 114 or communications tower 116. The satellite 114 is in communication with satellite dish 118. Both the communications tower and satellite are configured to send and receive communications from the drone regarding the location of the vehicle and condition/needs of passengers. The messages travel via network 120 and the drone 102 may be able to along with deliver the item, may be able to notify emergency services 122. For example, if an occupant of a vehicle requests heart medication, anti-seizure medication, stroke medication, or diabetic emergency medication, emergency services may also be notified based on the request.

In this application, multiple embodiments of a drone delivering an item to an occupant of a vehicle via an opening in which the term opening includes any side window such as a driver side front window, driver side back window, passenger window, rear sliding window of a pickup, a sliding door, a top opening such as a sun roof, moon roof, convertible top, or panoramic roof.

In one embodiment, a drone system identifies a product need based on traffic and other data. First, a controller identifies a traffic jam/congestion location based on multiple inputs such as crowdsourcing, RDS/TMC, roadway data/traffic monitor. The controller may be a vehicle controller, a remote system/server, a drone controller, or a combination thereof. Then input from cameras and other sensors are used to monitor traffic from a stationary nearby elevated position. The controller next calculates a Traffic Delay Time that is equal to a difference between an estimated time of travel with current congestion conditions minus an estimated time of travel with low-traffic conditions.

The controller then calculates a probability occupant needs during the traffic jam/congestion as a function of traffic delay time, time of day, past sales history (e.g., last traffic jam around past same time and day of the week had high demand for coffee, or last traffic jam in evening around the same time had high demand for a chicken sandwich), and specific customer past orders (individual customers in this traffic jam ordered a cheeseburgers 3 times last week). The controller will then send push notice to a vehicle (e.g., customer's vehicle). The push notice may include a message displayed on an infotainment system of the vehicle or a message displayed on a phone of a passenger in the vehicle. The push notice may be transmit directly to the display device (e.g., infotainment system, head-up display, instrument cluster). The display device may also be equipped with a touch screen, microphone, or button that will allow an individual to accept purchase of the food, drink, or item after a "Does customer want the product?" prompt. Once the transaction is complete, a drone may deliver the product(s) to vehicle in traffic.

Another embodiment is a system that describes a drone-to-vehicle-to-customer product transaction. A controller may receive input from an individual, for example, the individual may input to the controller, a desire for an item, (e.g., "I need a coffee"). Or the vehicle receives a "push request" from a drone, (e.g, "Need coffee?"). The vehicle then decides whether to communicate "push request" to individual. If the vehicle decides to communicate, a message will be displayed on a screen or an audible message will be output. The vehicle controller/nomadic device then receives individual feedback on items (e.g., selection data if multiple images are displayed, or audible selection data such as "large coffee" or "small coffee") and forwards that request to remote controller/drone controller.

The remote controller/drone controller communicates with a product vendor to locate item and calculate a pick-up time and cost. The controller adds travel time to a pick-up time and to estimate a delivery time. The controller transmits an estimated delivery time to vehicle controller or nomadic device. The remote controller/drone controller transmits a GPS position along with direction of travel to the remote controller/drone controller to coordinate a rendezvous location and time.

The vehicle controller/nomadic device or a drone controller predicts traffic and travel conditions at the estimated delivery time using roadway data and traffic monitoring data.

A Vehicle or remote controller estimates a vehicle speed and a lateral acceleration of the vehicle at the delivery time. The controller then branches based on if the estimated vehicle speed and vehicle lateral accelerations are below a speed threshold and a lateral acceleration threshold, respectively? If both are less, a rendezvous is possible, and the controller will proceed with transaction. If not, the controller will determine an alternative rendezvous location and re-compare with the thresholds. When the rendezvous is possible, the remote/drone controller applies credit card info to transaction and then retrieves item from a vendor. After the drone has possession of the item, the drone will then deliver the item to vehicle. There is a handshake between release of the item from the drone and acceptance of the item from the drone. A customer has to acknowledge it is ready to receive the item from drone. And then the drone releases the item to the customer.

Another embodiment includes a drone system that identifies a need for a product based on driver alertness. Here a vehicle identifies a driver's alertness is below a threshold via the use of vision recognition, a number of eye blinks per minute, nodding of a driver's head, or a measurement of eye lid opening with respect to historical eye data for the driver. The controller of the vehicle outputs a message to display. The message may be a simple request such as "Would you like a coffee?" or the message may include multiple images such as an image of a coffee, energy drink, espresso, cold water, tea. The controller then receives feedback from the driver as to a response and selection. The controller then transmits the request to a drone or remote controller to deliver the product to the vehicle at a designated location.

Another embodiment includes a drone method to increase sales using visual and audible drone-to-vehicle-to-customer communication. A drone/remote server identifies a probability of a need for a product by vehicles in a traffic jam. If the probably exceeds a threshold, the drone retrieves high probability item(s). For example, a drone may carry multiple bottles of soda and each bottle may be a different flavor, (e.g., 3 Colas, 2 plain water, a lemon-lime soda, an orange soda, and a root beer). The drone may communicate visually by flying most popular items in view of customers in the traffic jam/congestion (similar to how a food vendor at a ball park walks around and shows his/her product). This could include a screen or sign on the drone describing (in text or pictures) what items are currently available and how to pay for the items. A vehicle occupant then communicates with the drone via that item wanted by visual gesture, or audible gesture directly to drone, or occupant notifies vehicle, and vehicle notified drone by flashing headlights, or by using wireless communication. Drone confirms payment and delivers product to vehicle.

Another embodiment includes a method to complete hand-off in moving traffic for an autonomous vehicle (AV). Here a vehicle, drone, or remote controller can be configured to coordinate a transfer of a product based on a limited acceleration, deceleration, or maximum speed of the vehicle. Here an AV requests a product, a drone retrieves the product, and the drone approaches the AV in traffic. The AV assesses surrounding conditions and traffic conditions ahead to estimate vehicle acceleration commands at multiple future points in time, (e.g., 1, 2, 3, 5, 10, and 20 seconds into the future). The AV estimates the vehicle speeds at multiple future points in time, (e.g., 1, 2, 3, 5, 10, and 20 seconds into the future). The AV reports a desired rendezvous location to the drone. In which the controller determines that an estimated vehicle speed and vehicle lateral acceleration is below thresholds. If they are above the thresholds, the AV limits and reduces vehicle acceleration. The vehicle can transmit GPS location, and vehicle data such as acceleration data such that the drone can adjust to the vehicle speed based on vehicle acceleration data such that both drone and vehicle, once in proximity, can maintain a relative position. This allows for an occupant of the vehicle to retrieve the intended item from the drone, or for the drone to deliver the item to an occupant of the vehicle. Afterwhich, the drone verifies delivery and continues with a next task.

One way a drone can deliver an item is by lowering a tether that holds the item. Here, a drone communicates with the vehicle that the drone is ready to transfer the item. A controller then opens a window or a sunroof of the vehicle and notifies the drone when the opening is completely open that the opening is available for delivery. If, once the opening is opened, an occupant activates a switch to close the opening, the controller will send a notification that the opening is no longer available. Upon receiving the notification that the opening is available, the drone will lower a sufficiently long extendable rod, cable, or extension apparatus either below the drone or to a side of the drone while maintaining a distance between the drone and vehicle. The vehicle may transmit speed, heading and acceleration requests to the drone such that the drone may coordinate speed and direction with vehicle to maintain a distance therebetween. The drone may include adjustments for any motion (e.g., swinging) of the item. Once the item has been delivered, the drone confirms that the item has been delivered. The controller may then close the opening and the drone may depart to perform the next task.

In another embodiment, a drone lands on a roof of a vehicle with an delivery arm. The drone communicates with the vehicle that the drone is ready to land on a roof. Upon reception of an acknowledgement, the drone lands on the roof of vehicle using suction cups, electro-magnetics, or other system to secure itself to the vehicle surface. Once secured to the vehicle, the drone stops propeller rotation and notifies the vehicle that propellers have stopped. A controller then opens an opening such as a window or sunroof. Once the opening is open, the controller notifies the drone that the opening in available and the drone uses a robotic arm to move the item near the window or sunroof. The drone maintains the robotic arm in place until reception of a confirmation that the item has been received or the arm detects that the item has been removed. The drone then withdraws the arm, the controller closes the opening, and the drone departs.

In another embodiment, drone adheres to a side of a vehicle to deliver the item. When the drone is proximate with the vehicle and tracking the vehicle, the drone communicates with the vehicle that it is available to dock. The drone may dock vertically on a surface of the vehicle (e.g., a window or a door below the window). The drone may use suction cups, electro-magnetics, or other structure to adhere to vehicle surface. The location that the drone docks at is called an attachment location that may any of the locations disclosed in this application including a surface near an antenna, or an opening of the vehicle, etc. Once the drone has docked, the drone stops rotation of the propellers. Once the propellers have stopped rotating, the drone may transmit a notification to the vehicle that the propellers are stopped. The controller then opens an opening such as a window so that the item may be retrieved. Once the item has been retrieved, the controller closes the window and the drone departs.

In another embodiment, a drone may place a package on passenger seat. The drone while in communication with the vehicle confirms that a passenger seat is a desired delivery location. As the drone approaches the vehicle, the drone and vehicle may continuously communicate location, heading and acceleration data such that the drone and vehicle may maintain a relative position. When the drone is in a relative position with a passenger window, the drone communicates with the vehicle and a controller opens an opening such as the passenger window. The controller notifies the drone when the opening is available for delivery, afterwhich, the drone adjusts a flight pattern (by changing pitch, roll, yaw of the drone and the motor speed of propellers) to swing the item such that a trajectory of the item moves the item through the window and onto the passenger seat. The ability to swing the item is also based on a wind speed, determined by the pitch, roll, yaw of the drone and associated motor speeds. After the a delay to allow the item to land in the vehicle, the controller closes the opening and the drone departs.

Similarly, in another embodiment a drone may place a drink into a cup holder of a vehicle. The drone while in communication with the vehicle aligns speed and heading such that the drone flies in a relative position of the vehicle. The relative position may be above a cup holder such that the drone when in position may communicate with the vehicle and a controller may open an opening including a sun roof, moon roof, convertible top, panoramic roof, sliding rear window. Once the opening is available for delivery, the vehicle communicates with the drone. In one illustrative embodiment, the vehicle has receiving mechanism, such as outward swinging cup holder, or bowl and the drone communicates with vehicle to confirm cup holder is desired location. In another embodiment, the drone lowers the item via a tether to the cup holder. If the vehicle is equipped with a receiving mechanism, that mechanism may extend to facilitate delivery of the item. The drone may use vision recognition to align the product with mechanism and then lower the product into mechanism. Once the item has been delivered, the drone departs.

Figure 3:
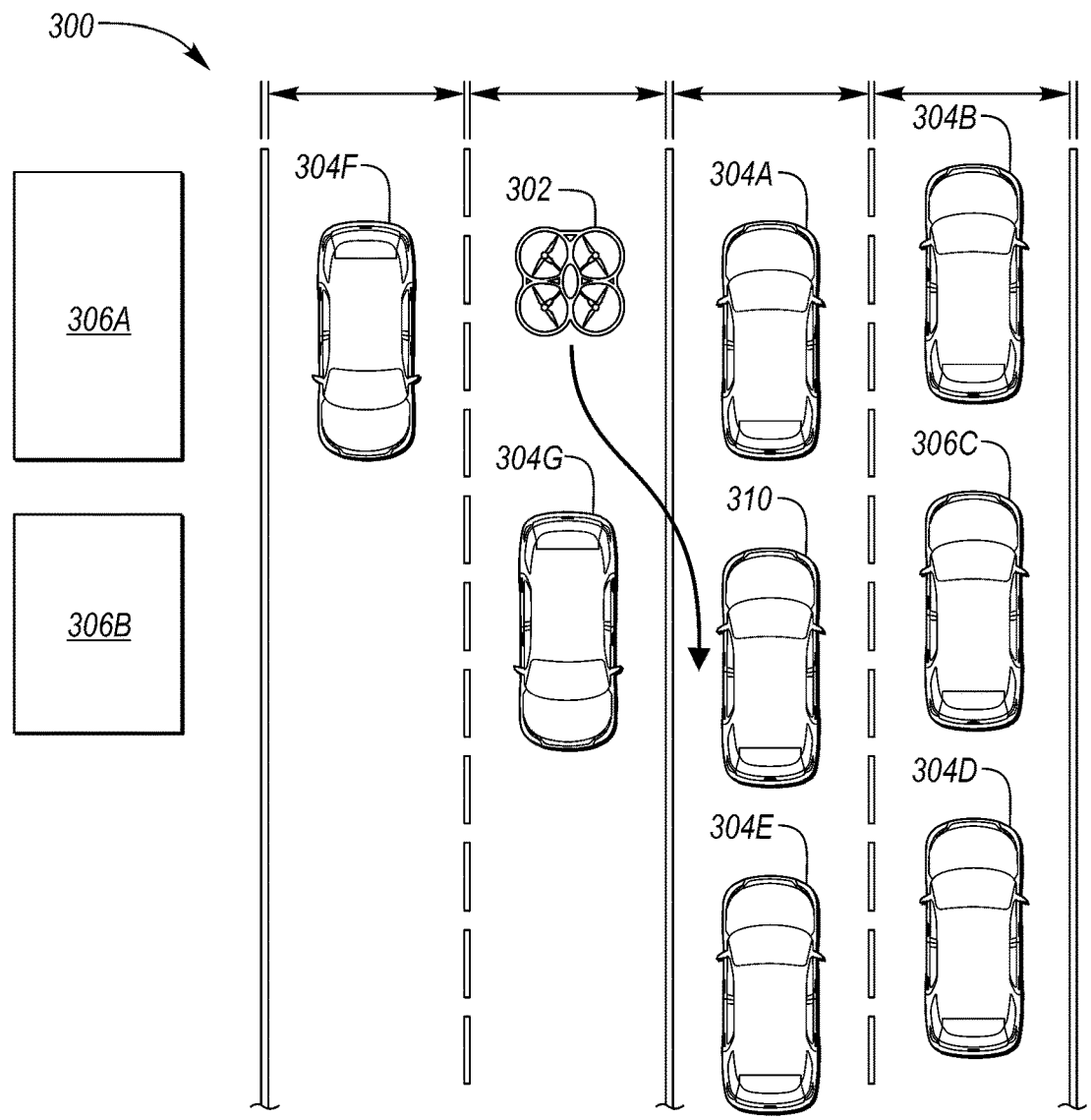
FIG. 3 is an overhead illustration of a drone delivery system during traffic congestion.

FIG. 3 is an overhead illustration of a drone delivery system 300 during traffic congestion. A drone 302 navigates to a customer vehicle 310 avoiding other vehicles 304 in the roadway. The drone 302 may obtain items from a store/warehouse 306 such as a café 306A or a warehouse 306B.

In this illustration, vehicles 304A, 304B, 304C, 304D, and 304E are traveling in the same direction as the customer vehicle 310, while vehicles 304F and 304G are traveling in an opposite direction as the customer vehicle 310. The drone 302 and customer vehicle 310 may be in communication with each other and the store 306 while ordering, payment, and deliver occurs.

Figure 4:
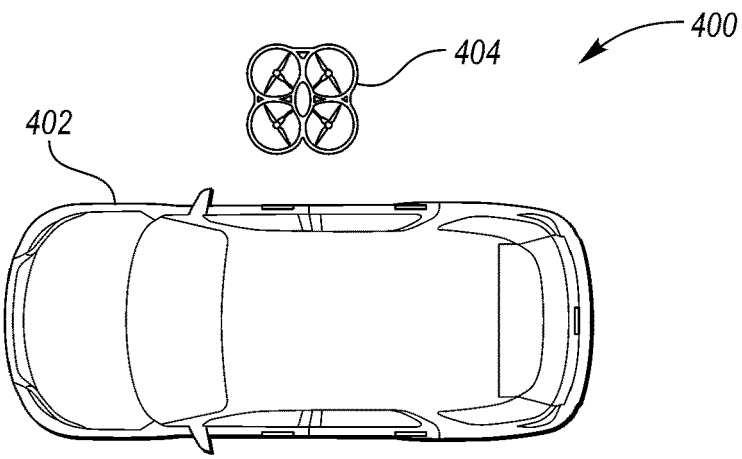
FIG. 4 is an overhead illustration of a drone coupled with a vehicle.

FIG. 4 is an overhead illustration of a drone delivery system 400 in which a drone 404 couples with a vehicle 402 to deliver an item.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A drone delivery method comprising:
   receiving a signal indicative of speeds of vehicles;
   responsive to the receiving, transmitting, to one of the vehicles, an availability message identifying a plurality of items selected based on the speeds;
   receiving from the vehicle a request for at least one of the items;
   retrieving from a location, the at least one of the items with a drone;
   guiding the drone to a rendezvous location; and
   delivering to the vehicle via the drone, the at least one of the items at the rendezvous location.

2. The method of claim 1, wherein the signal is based on at least one camera of the drone.

3. The method of claim 1, wherein the signal is received via a first protocol, and the availability message is transmitted via a second protocol that is different from the first protocol.

4. The method of claim 1, wherein the item request includes an item identification number, a Universal Product Code (UPC) number, payment information, or a preferred vendor.

5. The method of claim 1 further comprising, providing a delivery opening and placing through the delivery opening, the item.

6. The drone delivery method of claim 1, wherein the plurality of items are further selected based on a time of day.

7. The drone delivery method of claim 1, wherein the plurality of items are further selected based on past sales history.

\* \* \* \* \*